United States Patent
Holle (10) Patent No.: US 6,836,777 B2
(45) Date of Patent: Dec. 28, 2004

(54) SYSTEM AND METHOD FOR CONSTRUCTING GENERIC ANALYTICAL DATABASE APPLICATIONS

(75) Inventor: Dan Holle, Weybridge (GB)

(73) Assignee: NCR Corporation, Dayton, OH (US)

( * ) Notice: Subject to any disclaimer, the term of this patent is extended or adjusted under 35 U.S.C. 154(b) by 178 days.

(21) Appl. No.: 10/295,088

(22) Filed: Nov. 14, 2002

(65) Prior Publication Data

US 2003/0172084 A1 Sep. 11, 2003

Related U.S. Application Data

(60) Provisional application No. 60/335,395, filed on Nov. 15, 2001.

(51) Int. Cl.[7] .............................................. G06F 17/30
(52) U.S. Cl. ..................... 707/101; 707/104; 707/100
(58) Field of Search ................................ 707/104, 103, 707/101, 100, 2, 10; 715/501

(56) References Cited

U.S. PATENT DOCUMENTS

| | | | |
|---|---|---|---|
| 5,794,246 A | * | 8/1998 | Sankaran et al. ........... 707/101 |
| 5,918,210 A | * | 6/1999 | Rosenthal et al. ............. 705/7 |
| 5,920,871 A | * | 7/1999 | Macri et al. .............. 707/104.1 |
| 6,014,670 A | * | 1/2000 | Zamanian et al. ........... 707/101 |
| 6,032,158 A | * | 2/2000 | Mukhopadhyay et al. .. 707/201 |
| 6,044,374 A | * | 3/2000 | Nesamoney et al. .......... 707/10 |
| 6,208,990 B1 | * | 3/2001 | Suresh et al. .................. 707/6 |
| 6,339,775 B1 | * | 1/2002 | Zamanian et al. .......... 707/101 |
| 2003/0084053 A1 | * | 5/2003 | Govrin et al. .............. 707/100 |
| 2003/0093429 A1 | * | 5/2003 | Nishikawa et al. ........... 707/10 |
| 2003/0225768 A1 | * | 12/2003 | Chaudhuri et al. ........... 707/10 |

* cited by examiner

Primary Examiner—Jean M. Corrielus
(74) Attorney, Agent, or Firm—Whiteford, Talyor & Preston LLP; James M. Stover

(57) ABSTRACT

Disclosed is a system and method for constructing generic analytical database applications through the automated creation of metadata to establish an application structure controlling the availability and operability of individual applications.

5 Claims, 2 Drawing Sheets

SYSTEM AND METHOD FOR CONSTRUCTING GENERIC ANALYTICAL DATABASE APPLICATIONS

CROSS REFERENCE TO RELATED APPLICATIONS

This application claims priority under 35 U.S.C. §119(e) to the following co-pending patent application:

Provisional Application Serial No. 60/335,395, entitled "SYSTEM AND METHOD FOR CONSTRUCTING GENERIC ANALYTICAL DATABASE APPLICATIONS," by Dan Holle, filed on Nov. 15, 2001;

which application is incorporated by reference herein.

BACKGROUND OF THE INVENTION

1. Field of the Invention

The invention disclosed herein relates generally to database applications, and more particularly to a system and method for constructing generic analytical database applications through the automated creation of metadata to establish an application structure controlling the availability and operability of individual applications.

2. Description of the Background

Market analysis is a key tool in customer acquisition and retention. Performing a detailed market analysis of both potential product or service purchasers and existing purchasers, and from such analysis obtaining an understanding of customer behavior, product success, marketing success, and other business factors enables a supplier to make critical decisions regarding how they conduct business in order to maximize both new customer acquisition and the retention of existing customers. However, performing such a detailed analysis in order to obtain an accurate depiction of customer behavior can be a daunting task.

Many product and service providers maintain records of particular customer data, including demographic information, purchasing characteristics, etc., in addition to maintaining detailed records of products, pricing, and other business information. The collections of such data in electronic form can become enormous for large entities and attempting to digest such information into a logical structure from which one might be able to deduce customer trends and characteristics can be a highly technologically challenging task.

In order to analyze such large volumes of information to in turn make reasoned deductions about customer characteristics, product sales, and other business-related information, automated data mining tools have been implemented which attempt to identify patterns in data which might not be self-evident in a review of the data by a human analyst. Such data mining tools traditionally seek to extract patterns that exist in large volumes of data in order to forecast future expectations, whether of customer actions, future profit, inventory needs, scheduling requirements, or any other trend or characteristic that a planner may wish to forecast.

Unfortunately, however, the implementation of a successful data mining strategy often requires persons having highly technical expertise to develop accurate data mining profiles that might model such future expectations. Before a user may know what questions may be asked, the user must know what data is available to answer his questions. Likewise, in order to ask a particular question for which the data might be able to provide an answer, the user must know how to structure the question, i.e., have knowledge of the query language required to ask the question. The fact that database fields, customers, and analytical database applications all have distinct labels for the same conceptual piece of data further exemplifies the need for expert-level knowledge of the data structure. Given such labeling discrepancy, while a particular non-expert user may know in plain English the question he wishes to have answered, he lacks the expert knowledge of how that data is arranged or how the applications might extract and manipulate that data, and thus whether and how the data might provide that answer. While the creation of metadata describing how the data is arranged may to a limited extent alleviate some of the problems arising from such labeling discrepancy, the creation of metadata itself can also be a daunting task.

The development of a successful data mining strategy traditionally involves six distinct phases, as follows: (i) obtaining an understanding of the project objectives and requirements from a business perspective, then converting this knowledge into a data mining problem definition and a preliminary plan designed to achieve the objectives; (ii) initial data collection and activities to become familiar with the data, identify data quality problems, discover first insights into the data, and detect interesting subsets to form hypotheses for hidden information; (iii) constructing the final dataset to be used by the predictive modeling tools from the initial raw data, including categorizing continuous variables, eliminating outlying data values, joining related data sources, and extracting a sample of the result; (iv) selecting and applying various modeling techniques, and calibrating their parameters to optimal values, which often involves returning to the data preparation phase; (v) evaluating the model to be certain it properly achieves the business objectives and meets accuracy requirements; and (vi) deployment of the model, in which analysts consider the application of the model to new inputs, consider the application that will eventually receive the scored prospects, and consider the operational issues surrounding the ongoing execution of the model. Such a process often involves up to six months of expert time to develop a single model, with the business understanding, data understanding, and data preparation phases consuming the largest portion of this effort.

Obviously, it would be highly advantageous to provide a means by which the business understanding, data understanding, and data preparation phases could be implemented in less time so as to provide timely analysis, and without the need for such expert technical intervention.

Moreover, in order to provide adaptive applications that provide the greatest possible utility to users, it is necessary that the applications themselves be able to adapt to the data that is available, such that all application functions that are supported by the available data are readily available to the user, while application functions that are not supported are not available to the user.

SUMMARY OF THE INVENTION

It is, therefore, an object of the present invention to provide a method and system for constructing generic analytical database applications which avoids the disadvantages of the prior art.

In accordance with the above objects, a method and system for constructing generic analytical database applications is provided which allows users to access application functions which are enabled depending upon the data stored in databases, as reflected by metadata.

The metadata connects user terminology, application terminology, and database terminology in a common framework. The system of the instant invention allows the construction of analytical database applications having broad adaptability in terms of the database layout and business functions supported. The applications operate against an abstract business model, with all components (i.e., "roles") optional. Application functions presented to the user depend on the configuration of roles which are present in the metadata. Databases are described in the metadata at an entity relationship level, and are annotated with semantic business roles, as well as with a wide variety of user preferences for naming and presentation. The end-user sees neither database terminology (SQL names) nor application terminology (roles). Rather, they see things in relevant business terms, and they only see applications and functions which are viable given the metadata. If there is a database in place, much of the metadata can be guessed automatically (e.g., table associations or roles). This means introduction of this technology provides a fast start, followed by incremental refinement which surfaces new application functions and more familiar user terminology.

The application environment of the instant invention seeks to provide a suite of applications which may be implemented across as many database scenarios as possible, and thus creates generic applications which use rich metadata to adapt to an existing data environment. The application environment of the instant invention provides a variety of information and services to the individual database applications, such as information on the user (e.g., user preferences, user privileges, etc.), and information on the data visible to that user (i.e., metadata describing the information both in human terms and machine terms). The applications, in turn, provide a variety of information and services to the application environment, including application name, description of the currently-specified task, and an indication of whether the user and data characteristics are sufficient to run the application.

By interacting with data on metadata terms instead of database terms, applications can present data using end-user terms, rather than being forced to resort to database names. Common metadata means applications use common terminology to refer to business elements. As the metadata changes, the terminology changes for all applications simultaneously.

The application environment of the instant invention adapts to business data as it stands. If an application is irrelevant to a particular business (the underlying information to support it is not present), it simply doesn't appear as an option in the user interface. If, in fact, an application is of interest, the application environment of the instant invention can "ask it" why it's not available, and it can articulate the missing pieces it needs. Once these pieces are provided, the application appears.

Each application in the suite of applications made available to any particular user has a unique name. Moreover, within each application is a set of application-specific user pages, each of which in turn has a unique name within that application. The individual application pages are defined in XML. More particularly, the HTML content for each application page is specified, and application-specific XML elements describing substitutions and conditional HTML generation may likewise be embedded in each application page. Such XML instructions are of a form that can be detected in an application-independent way, and presented to the application itself for resolution. Thus, the application may adapt the user interface, presenting select application pages to users depending upon particular criteria which is set forth in the XML code embedded in each page. For example, some XML instructions controlling the generation of particular HTML on a page presented to the user may include: (a) "substitute the user's name here"; (b) "create an input field here, initialized to the name of the current table"; (c) "if the user had administrative privilege, generate the following HTML; otherwise, omit it"; (d) "create a hyperlink here, exposing the name of the current table to the user, and linking to the table summary application if clicked"; (e) "generate a column summary table here, with the column headings I supply."

Thus, application pages may be externalized in metadata. This construction provides the user interface independence from the application code itself, enabling for example the templates for a given application page to be modified for particular users without modifying the application itself. This means that it is possible, for example, to have multiple users interacting with the same databases in different languages, each appearing to have theirs as the "native tongue". (Note that presentation down to the data value level is controlled through metadata, so data values can be presented and described in the user's native tongue).

Another aspect of the system and method of the instant invention is the process of generating such metadata that is used by the application environment, i.e., discovering data structures in databases which structures may be recorded, indexed, and accessed to provide a semantic framework of the data. Business data is typically represented in relational form. In the absence of any further information, an experienced database analyst can generally make use of a database by looking at names of fields, guessing relationships between tables, surmising business roles of various attributes, and testing those ideas by doing SQL queries against the data. The system and method of the instant invention automates this discovery process, yielding a more systematic and comprehensive set of observations, data distributions, and "informed guesses" about the semantics of the database. These can be presented in a form that is meaningful to someone who would not have been expert enough to generate the information manually. The automated data structure discovery process of the instant invention preferably includes the generation of data distributions for all the columns, row counts and column layouts of all tables, relationships (joins, associations) between the tables, an entity-relationship diagram of the data, and roles of the data items in the business (e.g. customer, sales, product).

Once the informed guesses are manually refined (by an interaction with a DBA which can now be very specific), this semantic framework can be updated automatically as the database changes.

The automated data structure discovery process of the instant invention may be described with reference to four key methods and the systems for their implementation, namely, (1) data categorization; (2) generation of abstract business semantic roles associated with database objects (e.g., tables, columns, or column categories); (3) identification of links between data tables (including join paths and associations); and (4) generation of an easy-to-use graphical and textual description of the metadata which may inform persons lacking technical database expertise of key aspects of the semantics of the data, such that non-technical users may readily adapt the metadata as necessary without having intimate knowledge of individual database structures.

1. Data Categorization

The first above-mentioned method, data categorization, involves apportioning data into organized subcomponents in order to ease the application of an analytical task. Often times, categorized data is simpler to use and more meaningful than raw data in implementing an analytical task. For example, presenting the distribution of gross profits as a function of sales price (thousands of sales prices, meaning thousands of result values . . . with gross profits for $9.95 and $9.96 reported separately) is almost meaningless, but presenting the same information by sales price category (a dozen carefully-chosen price ranges, with gross profits for each) could reveal useful insights about which sorts of sales are generating the most profits. Unfortunately, manual value categorization is slow, expensive, inconsistent, unresponsive to changing data, tedious, and subject to human error. This often means it's not done , and that therefore end users must interact directly with raw data.

It is useful, a s a reference for database users, to display counts by category for the whole database. This provides a simple visual crosscheck that can surface unexpected behavior in general, and can help spot data quality problems in particular. Columns which are rarely populated, or which generally contain some default value, are easily spotted. Unexpected spikes in the distribution might identify something needing further investigation. Multimodal distributions may reveal cases where one data value is representing different information in different source systems.

Categorized data also facilitates data mining. Some data mining algorithms or data mining tools require categorized data; for these, the data mining analyst must do the data categorization up front. This can be a time-consuming and error-prone process. Some estimate this to be 80% of the data mining task.

Categorization provides another benefit for data mining. Continuous variables in databases often have outliers, i.e., extreme values which are often errors or other anomalies which may be present in a very small number of cases, but by virtue of their values have significant influence on the algorithms, "distracting" them from seeing the patterns in the broader databases. Using categorized data instead of raw data, these problems are minimized.

The method and system of the instant invention automatically establishes a categorization for each column in the subject databases, mapping the full range of column values into some number of category values. This categorization is then preserved as metadata.

This categorization uses the existing data to find an encoding which is suitable for use by a human analyst as well as by an automated data mining algorithm. This is done by starting with a general categorization scheme which would be meaningful to an end-user, based on the underlying data type and actual data. For example, if the data is numeric, the method of the instant invention may consider uniform value ranges, with boundaries which are round numbers. Then, among all such possible categorizations, the method chooses the one which conveys the maximum information about the underlying data, using information entropy. Since the method of the instant invention automates data categorization, applications can rely on categorization being available for all database columns "on day one". The categories created by the automated categorization of the instant invention, therefore, provide applications and tools with a good starting point for presenting statistics relating to a database attribute.

2. Semantic Role Generation

The second above-mentioned method, semantic role generation, involves the association of particular business roles with database objects, such as tables, columns, or column categories, such roles representing an abstract, generic use of that object within the business. Once generated, these roles are captured in metadata and then used by applications, which thereby acquire a rudimentary "understanding" of the business data.

By way of example, semantic roles relating to a database table may include "customer" (a person or organization which buys products), "product" (an item or service sold to a customer), "sale" (an event associating a customer, product, and price on a date), "basket" (collection of related sales to a customer), "marketing message" (brochure, web page, telemarketing campaign, etc.), "marketing contact" (an event associating a message with a customer on a date), etc.

Roles are generic rather than industry specific. They are handles for applications, not for end-users. Thus, for example, an application for product affinity analysis might use semantic role metadata to find a database table playing the "basket" role, then use other metadata to find the associated "sale" and "product" data. Although the terminology suggests a retail sales database, it may be that the "basket" is an airplane ticket (a collection of flights bought by one customer), or a set of optional features for a car, or some other collection. In each case the application would identify "products" which tend to be bought together, i.e., information which may be useful for packaging, pricing, or promotion.

Roles can also be defined for database columns, such as sale price, sale date, product cost, contact date, etc.

Roles can likewise be defined for column values (or categories), such as bad credit risk, customer voluntarily terminated service, etc.

One database object may play several roles. For example, for a dating service, the "customer" and "product" role may be played by the same table. Likewise, one role may occur multiple times. For example, an auto manufacturer may represent cars and optional features for cars in separate tables, even though both are products.

All roles are also optional. For example, a retailer operating on a cash basis may not have customer data.

Here are some further examples that might be helpful in understanding semantic roles, and how they are used by applications. A profitability application may look at the metadata, and find one column with the "sales price" role; it may also discover a "product cost" column, perhaps in the sales transaction or the product table . . . no matter; it has what it needs to ascertain profitability of each sale. The application, seeing that sale date was present (possibly in the sale table, or maybe in the basket table) would now be able to offer the user the ability to view gross profit and margin trends over time.

Likewise, a cross-selling application might look for the Customer role in the metadata, and find that there are two (a table identifying individual buyers, and a table identifying households). In this case the application must resolve the ambiguity, perhaps by simply presenting the decision to the end user . . . "Do you want to cross-sell to Households or Individuals?"

Consider a marketing analysis application, which looks at sales data to identify and report significant product sales increases associated with specific marketing programs. It might require tables with the "marketing contact" and "sale" roles to be available before it can operate. One company might use this application to analyze web page effectiveness (each web page is a marketing message, each page hit is a contact). One might use it to gauge effectiveness of brochures (each brochure is a message, each time one is sent is a contact). A third may use the application for both, comparing web-based and direct mail promotions.

In sum, semantic roles can be used by applications to provide a level of data independence. These applications can determine if they have enough information to run: for example, a simple revenue reporting application might look for the sale price and sale date roles to determine if its revenue reporting services are available. If not, the application can be omitted from user interfaces. Applications which cannot run can clearly articulate what they need to run.

Applications can use roles to adapt their queries to fit the data model, instead of forcing the user to adapt his data model to fit the application. For example, a profitability analysis application might generate a simple query if price and cost reside in the sales transaction data; but if not (say, if the cost exists in the product table), the function can still be supported by using join path metadata to bring the cost and price information together. This enables the business to decide the logical place to capture cost information.

3. Identification of Links Between Data Tables

The third above-mentioned method involves the identification of links between multiple tables, which links may optionally also specify a join path and/or an association. Query tools are notorious for presenting end-users with a bewildering array of query specification capabilities, many of which lead to queries which are well-formed from an SQL perspective, but which are semantically incorrect. The method of the instant invention uses metadata to guide the user towards semantically correct queries, and suggests ways of presenting user options in a more logical fashion. By automatically detecting join paths, the method of the instant invention removes a tedious step from metadata creation.

The ability to perform data mining against multi-table data is important. Most real-world data mining exercises involve finding customers with certain in behavior, where that behavior appears elsewhere in the database. By creating a broad framework for data mining that goes beyond the flat-file model, we can start to think about considerably more flexible data mining tools, wielded by people who no longer need to deal with databases at an SQL level.

A join path defines how two tables may be relationally joined. There are some number of column pairs (one column in each table) that can be used to link the tables in a relational join operation. Thus we might have a join path between the "cust" and "sale" table, with the "id" column in "cust" being joined to the "custid" column in "sale". Typically, join paths involve a single pair of equijoin column, but many may be present (composite keys).

The metadata also characterizes the association multiplicity (in UML or ER terms). Thus, one sale might link to one and only one customer; each customer may link to any number of sales (possibly zero). The multiplicities are associated with each end of the link. This is a "many to one" association.

Both the join paths and the multiplicities are automatically discovered and captured in the metadata using the method of the instant invention, and may subsequently be reviewed and refined by a database expert. This metadata (join paths, multiplicities) provides a type of semantic information that is useful for both humans and applications. For example, if "revenue" is defined against a sales table as the sum of the extended price, then a conventional SQL-based database tool might offer an ability to break down revenue by other attributes in the sales table, for example by date, product, or store. This would be a simple single-table SQL operation. However, each of these attributes is typically too detailed, comprising hundreds or thousands of values, to be of direct use as a breakdown criterion.

Given join paths and multiplicities, a "smart" application can go down many-to-one join paths to offer a broader set of breakdown criteria for an end-user to choose from. For example, revenue can be broken down by customer attributes, since there is a many-to-one relationship between sales and customers; similarly, revenue can be broken down by product department since there's a many-to-one relationship between sales and product.

However, you generally can't follow associations the other way: if the customer table had a column telling how much he spent with the company last year, then breaking down total customer spend by customer attributes would make sense; but breaking it down by sales attributes would not. "Total spend by sale date" would result in valid SQL and would return an answer, but not at all what it sounds like: if customer 107326 bought 7 things on a particular sale date, then the reported "total spend" for that sale date would be incremented by 7 times 107326's spend last year.

Since the metadata contains both join paths and multiplicities, it contains sufficient information to identify semantically-correct questions, as well as sufficient information to generate the corresponding SQL for the queries.

Similar rules make it possible to broaden the applicability of data mining to include multi-table data. To the best of the inventor's knowledge, all commercial data mining tools operate against single tables: if an analyst wants to predict which kind of customers spend more on clothing, then both the output (e.g., clothing revenue) and the inputs (e.g., geographic region, age, occupation, sex, etc.) must all exist in one table or flat file. It is apparent, however, that if customers have a postal region, and the analyst has a postal region table (containing, e.g., a neighborhood classification: rural, suburban, etc.; or distance to the nearest store), then it is sensible to include these characteristics as inputs, even though they are in another table, since each customer has one neighborhood classification. Columns of any table which stands in a one-to-many relationship with Customer (directly, or through a chain of 1:M relationships) are semantically valid inputs for a Customer model.

Similarly, we need not limit ourselves to the Customer table when considering outputs to a propensity model. Using the same sort of logic we did for queries, we can consider aggregate statistics for any table standing in a many-to-one relationship with Customer.

4. Generation of Metadata Description

The fourth above-mentioned method concerns the production of an HTML document mapping the metadata such that it may by easily digested and utilized by a wide variety of end users, including database professionals, data analysts, and business end users, through a standard web browser.

Metadata is designed to be navigated by applications, not humans, and is thus ordinarily expressed in XML such that any analysis or manipulation of such metadata is ordinarily capable of being carried out only by persons having technical expertise in the particular data and database structures being analyzed. Thus, a major problem preventing the effective use of metadata is the fact that the "result" is often inaccessible to the people who need it. The metadata is conventionally viewed through tools that presuppose the user knows the basic idea of how the metadata is organized. Since the metadata is very much organized around database structures, the tools tend to assume that this is the right setting for presenting the metadata, which is fine for persons having the required database technical expertise, but for the other 99.9% of the universe, this presents a problem.

This means that metadata, once created, is difficult to get right (get reviewed by the right people), since they don't have the tools and they are not technical metadata experts. Further, if a user needs to find out about, for example, the kind of geographical information the company has about customers, they don't go to the metadata for the same sorts of reasons.

By casting the metadata into HTML, the method of the instant invention makes it accessible to a wide audience, and eliminates the need for exotic tools (and exotic tool usage skills). Also, given that the metadata generated by the system and method of the instant invention goes beyond conventional database metadata (being more biased towards applications and end-users than towards databases), the document generated is, in fact, palatable to that broader audience.

The richness and interplay of the various types of metadata (going beyond tables and columns) allows the method of the instant invention to present information which is both useful for navigating the metadata and useful in understanding the underlying business information.

In addition to the above-described methods and systems for automating the discovery of a data structure and its recordation in the form of metadata, it is also important to note that once generated, the metadata must be maintained in order to reflect changes and updates in the data. For example, new tables and columns are likely to appear in subject databases over time. As underlying data changes, data value distributions change as well. With use, descriptive metadata (end-user labels, pop-up short descriptions, longer descriptive paragraphs) get out of date as new business targets and initiatives replace old ones.

It is quite normal for an organization to make a significant investment in metadata, only to find a year or two later that "natural forces" have eroded the relevance of the metadata to a point where it is an impediment rather than a valuable asset. However, many of the above changes can be automatically reflected in the metadata, and in other cases the changes can be reflected through an automatically-assisted process. In order for the metadata to reflect such changes, the system and method of the instant invention provides the following functionalities.

First, when a user is initially creating metadata, he specifies which data objects are of interest. For example, he might say "I am interested in all tables in this database." In addition to capturing the actual data objects (in this case, the tables), the method and system of the instant invention also captures the way in which they were specified ("all tables in this database"). Later, if new data objects have appeared, the method and system of the instant invention can automatically include them in the metadata.

Second, the method and system of the instant invention captures, value distribution in a manner which allows data value metadata to be recreated from current data, and automatically recognizes when previous assumptions (e.g. data type) are invalid, requiring human intervention.

Third, whenever descriptive metadata is presented in the normal course of application execution, the method and system of the instant invention presents authorized users with the ability to change the description on the spot. That is, if the description does not fully convey what is needed (in the context where it is needed), it can be corrected on the spot.

Finally, the metadata evolves as it's used. It can be mapped into HTML for review at any time, in which case all the current knowledge (database, description, roles, relationships, etc.) are placed in one, current, document which is suitable for use by end-users.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

Figure 1:
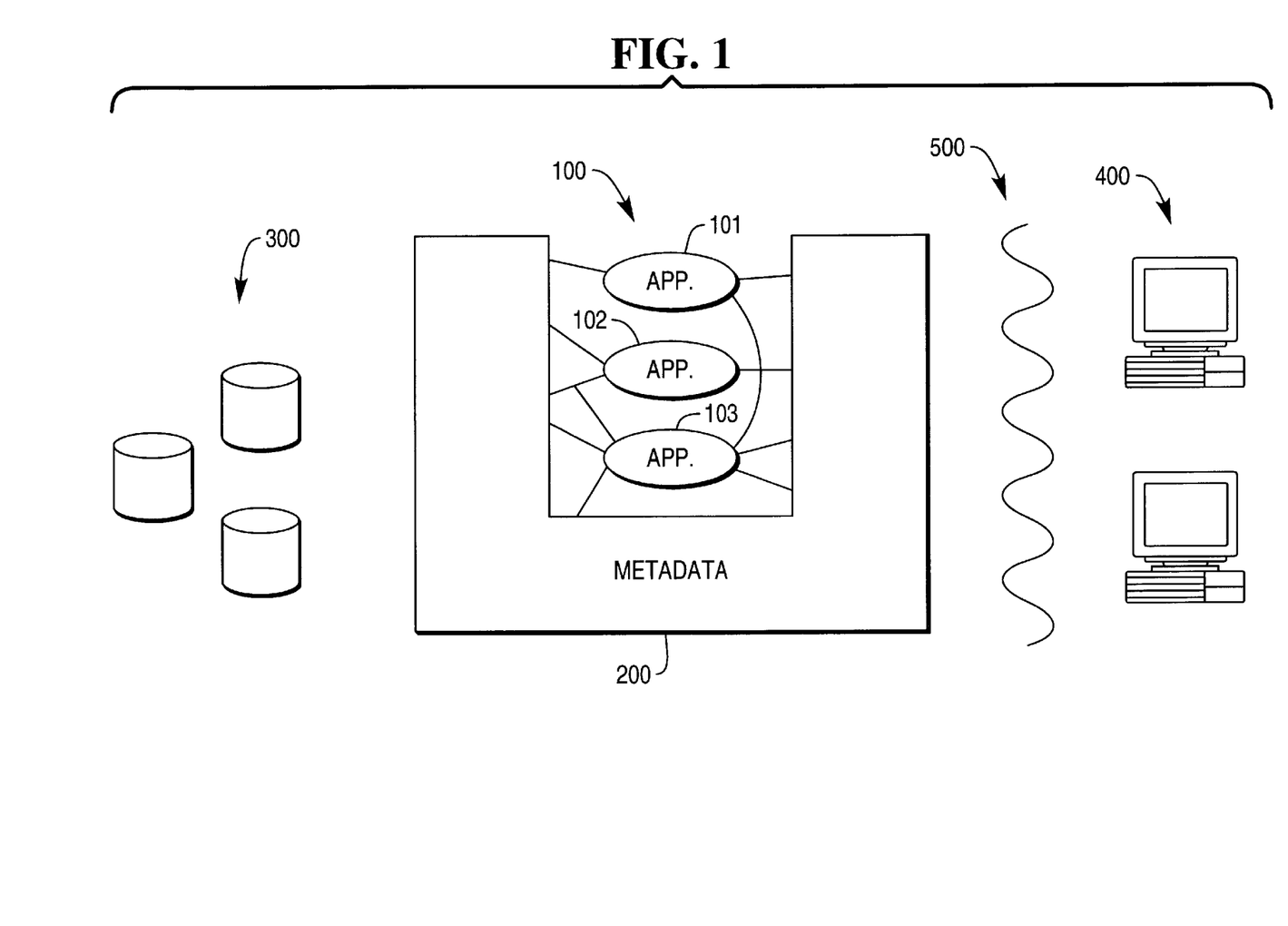
FIG. 1 is a schematic view of the system of the instant invention.

As shown in the schematic view of FIG. 1, the system of the instant invention comprises a suite of analytical database applications (shown generally at 100), namely, applications performing particular analytical functions, whereby the determination of which applications are available for user operation is based upon data available in databases (shown generally at 300) as indicated by metadata 200. A number of databases 300 comprise data relating to particular business functions, and metadata 200 reflects semantic business roles that are present in the data stored in databases 300. A plurality of users (shown generally at 400) may access the suite of applications 100 through a network 500, such as a wide area network such as the world wide web. A user interface is provided which enable's users 400 to have access to only those applications 100 that are supported by the data in databases 300.

As will be described in greater detail below, once generated, the metadata 200 reflects the structure and semantic roles of data stored in databases 300. Applications 100 query users 400 for user preferences, user privileges, etc., and likewise query the metadata 200 describing the information stored in databases 300, in order to determine which applications 100 should be made available to users 400. The user interface in turn adapts to the available data to enable a user to access only those analytical applications which are supported by that data.

From a schematic perspective, the metadata identifies database data, including structural and statistical information. Layered onto the metadata are categorizations and end user terms, so that the data can be presented in a meaningful way. In order to capture semantics, database tables and columns are tagged with roles which identify recognizable business objects such as "product" or "sale" or "customer." The applications, by interrogating the roles, can determine if they have enough information to operate; if they do have enough information, they participate in the user interfaces (i.e., the user can "see" the applications). Applications can then utilize roles and other metadata to map application database questions into SQL database queries, and present the appropriate information back to the user.

The application suite described above is cast as a JAVA servlet. This means that, in response to small user inputs, HTML pages are generated. There are mechanisms within the servlet API to let the servlet identify particular users based on past activity. Thus, each user interaction with the system may be viewed as a "session" beginning with a logon event, at which time a session is associated with a particular piece of XML metadata for that particular user.

The metadata itself take the form of an XML file that defines the user's "desktop"; this XML metadata describes tables, columns, joins, statistics, roles, and so forth. Likewise, there is a controlling application which provides a framework for the business applications used by the user. For instance, the controlling application generates the page framework, and provides services that help the applications generate the page content. The controlling application also provides various metadata and database support services.

The controlling application is flexible in controlling and modifying the applications. When the web server starts, the controlling application gets a list of applications at this installation. Each application is then dynamically "found" and an initialization service is called, which does whatever the application needs to do to prepare it for performing its particular analytical function. In the event that an application is unable to perform its intended function, the controlling application simply ignores such application and prevents it from being displayed to the user.

Each time a user connects, user properties are picked from a file. These properties include the user's password, his contact information, the applications which he is interested in (which may, for example, include "all available applications"), and a file name for his XML metadata. At the time that the user connects, the controlling application queries each application in the suite to determine whether such application should be made available to that user. The controlling application then presents to the user only those applications that are authorized based on the user's metadata. Likewise, if certain applications are not to be made available to a particular user, the controlling application will not arbitrarily impose those applications' constraints on that user's data.

Thus, at a new site, applications automatically configure themselves around the data. If one site is interested in marketing, then there might be customer, sales, and product data, providing enough information for example for the cross selling application. Another site, only interested in inventory management, might have inventory, sales, and product data. They could not do cross selling, but they would be able to run an application which suggests inventory replenishment. Both sites might be able to look into product profitability. Thus, for example, there may be no global database design that incorporates both marketing and inventory management requirements. Rather, each application has a set of database requirements specific to the application, and it has facilities to be flexible about how those requirements appear in the database. This flexibility means that the system of the instant invention adapts to data in place, rather than forcing a particular database design which must cater to many, potentially conflicting, requirements.

Each user also has context that, for example, may indicate the current topic of discourse. For example, if a user is looking at a customer segment, or a product segment, that information is in his user context. If that user goes into a cross selling application, that application might find these things and start with the assumption that the user wants to cross sell those products to a subset of those customers, and allow the user to refine it.

The user might also explicitly change metadata (e.g., click a link which lets the user provide a description of a data item) or implicitly change it (e.g., by creating a propensity model). These are saved in the user's XML metadata via services in the controlling application.

As explained above, a key feature of the application environment of the instant invention is the interface between the application suite 100 and metadata 200. However, prior to enabling this interface, it is necessary that an effective metadata structure be created, and that it be created in as efficient means as possible. The generation of such metadata that is used by the application environment is implemented through the system and method of the instant invention which yields a systematic and comprehensive set of observations, data distributions, and "informed guesses" about the semantics of the database. The automated data structure discovery process of the instant invention preferably includes the generation of data distributions for all the columns, row counts and column layouts of all tables, relationships (joins, associations) between the tables, an entity-relationship diagram of the data, an roles of the data items in the business (e.g. customer, sales, product). Once the informed guesses are manually refined (by an interaction with a DBA which can now be very specific), this semantic framework can be updated automatically as the database changes.

As mentioned above, the automated data structure discovery process of the instant invention may be described with reference to four key methods and the systems for their implementation, namely, (1) data categorization; (2) generation of abstract business semantic roles associated with database objects (e.g., tables, columns, or column categories); (3) identification of links between data tables (including join paths and associations); and (4) generating a easy-to-use graphical and textual description of the metadata which may inform persons lacking technical database expertise of key aspects of the semantics of the data, such that non-technical users may readily adapt the metadata as necessary without having intimate knowledge of individual database structures. Each of these key methods and systems for their implementation will now be discussed in greater detail.

1. Data Categorization

Figure 2:
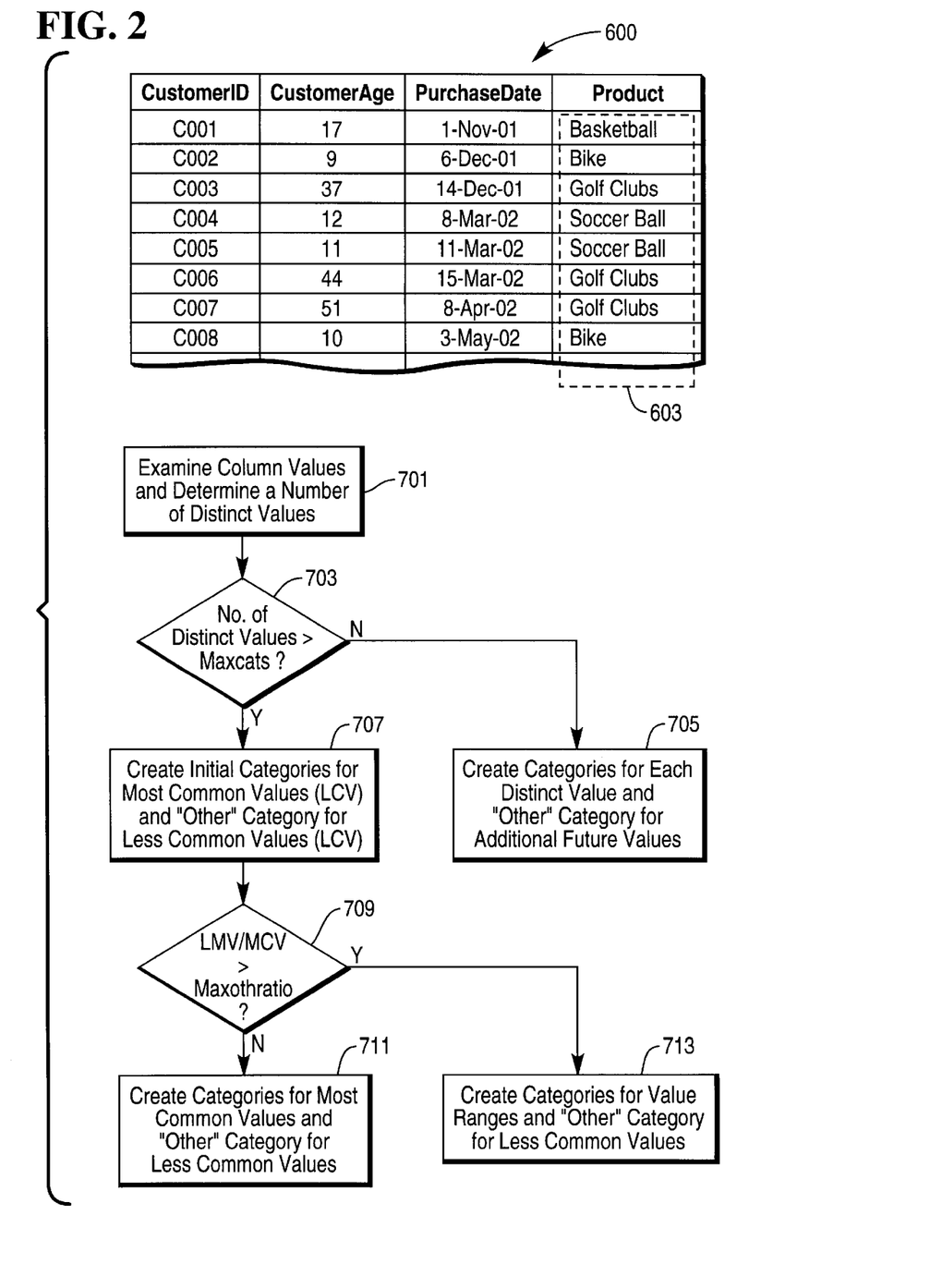
FIG. 2 is a flowchart illustrating a method for automatically categorizing data values contained within a column in a database table, in accordance with the present invention.

The following describes a data categorization method, broadly illustrated in FIG. 2, which produces useful categorizations of real-world data without human intervention.

An input comprises a column in an SQL database table of some common data type (integer, decimal, float, character, date). The desired output is a categorization for this column which has the following characteristics: (i) is generally useful for an end-user; (ii) is in a sense "optimal"; and (iii) is realizable in SQL (both the categorization method and the resulting categorization).

An example database table 600 including customer purchase information is shown in FIG. 2. Table 600 includes four columns, labeled CustomerID, CustomerAge, PurchaseDate and Product, respectively. Each row in table 600 represents a sporting goods purchase made by a customer and includes a unique customer identification number, the age of the customer, the product purchase date, and a description of the product purchased. Character, date and integer data types are represented. An example of column values to be categorized in accordance with the method illustrated in FIG. 2, and described below, is identified by reference numeral 603.

The following values control the heuristics used in the method which follows. The parameters shall be referred to with the following names: (i) Prefcats: preferred number of categories, e.g. 10; (ii) Maxcats: maximum number of categories, e.g. 25; (iii) Othratio: an acceptable ratio between count in the "Other" category and the biggest non-Other category, e.g. 0.5; and (iv) Maxothratio: largest acceptable ratio between "other" and the biggest non-Other, e.g. 1.

Before beginning the step-by-step description of the method, it is important to first set forth particular background matters.

Ranges: The categories are built up from value ranges. That is, each value range is assigned to one category, and each category can consist of multiple value ranges. This makes it possible to use the categorizations in SQL. For example, suppose one were to categorize age into bands of under 20, 20 up to 40, 40 up to 60, and 60 or more (4 categories). We could count the rows by age via an SQL query formulation as follows:

```
SELECT COUNT(*),CASE WHEN age<20 THEN 1
    WHEN age<40 THEN 2
    WHEN age<60 THEN 3
    ELSE 4 END
    FROM <table>
    GROUP BY 2
``` for SQL implementations supporting the standard CASE expression. For various versions of Oracle, another way must be found. One possibility is

```
SELECT COUNT(*),DECODE(age, GREATEST(60, age), 4,
    GREATEST(40,age), 3,
    GREATEST(20,age), 2, 1)
```

Etc.

Categories with Ranges: If we are forced to use ranges to articulate categories, then these ranges must be chosen in a "reasonable" way for an end-user. The boundaries should be both natural and uniform. For dates, this might mean the boundaries are months, quarters, years, or 5 year periods. For numerics, we might have intervals with leading digits of 1, 25, or 5. No range should span 0 and contain actual occurrences of both positive and negative values; the existence of exceptional values of "unexpected" sign is something that should not be hidden.

The "Other" Category: When we generate categorizations, as a practical matter we may need to introduce an "other" category with no occurrences, so that all possible values of the underlying data type can be categorized. In this way, changes to the target database don't cause the categorization to fail. If our categorizations are being captured in metadata, then it is useful to identify such "defensive other" ranges so that, if such values are later detected, they can be flagged in some way, possibly suggesting that the column might require re-categorization.

In order to provide for such "defensive other" categorization, associated with each category, an initial row count is preserved, giving the number of database rows falling into the category at the time when the column categorization was generated. This information is useful in detecting cases when data requires re-categorization.

For most data values, re-categorization is never required, such as when a particular column only contains the values "Y" or "N." However, there are other sorts of data for which re-categorization is almost inevitable, such as "Date of First Purchase." In this case, every new set of data is likely to contain new (recent) data values.

From time to time, therefore, it may be useful to review categorizations. In order to review such categorizations, columns are displayed in order of descending category score degradation (initial score minus current score, using the three-factor categorization formula discussed elsewhere). Once such order is displayed, a data analyst may readily identify those columns requiring re-categorization.

Scoring Categorizations: In some cases various steps of the method generate families of candidate categorizations, i.e., a set of fixed width intervals, possibly with open intervals at each end (e.g., "100 or more"). The widths of the intervals must generally be of such size or delineation so as to be palatable to human users. For example, dates might be banded into weeks, months, quarters, years, etc. Likewise, with numeric data, intervals might be some power of 10 times 1.0, 2.0, 2.5, or 5.0. Given the dispersion of the data values, often times only a few possible interval sizes need be considered.

When families of candidate categorizations are generated, we choose between them by scoring categorizations in a way which considers information as well as human factors; then we seek the categorization with the maximum score.

$$\text{Score} = -(\text{"other" factor})(\text{count term})\Sigma p_j \log p_j$$

Where $p_j$ is the probability density for category j, i.e., the proportion of the instances in the actual data falling into this category, such that the sum of all $p_j$'s is 1.

The "other" factor adjusts the score to reflect outlier categories by biasing categorizations away from ones containing the "other" category (in the case of a common value categorization) or open-ended ranges (e.g., "less than x", "x or more"), if possible. Clearly, these sorts of categories are less specific about the values, and therefore are less desirable than the categories defined by specific values or specific endpoints. If the "other" category is present, its population should therefore be relatively small. For example, this factor might be 1 if there's no "other"; 1–1.5/prefcats if "other" is required (in other words, adding 2 regular categories is preferable to adding "other", but with 3, "other" wins); a linear function as the size of the "other" category increases, such that the "other" factor drops to 0 when maxothratio is reached.

The category count factor keeps the number of categories from growing indefinitely. Generally speaking, the greater the number of categories, the larger the information measure. More particularly, if there are more distinct categories, one may discern more information about an instance. However, for generalization and presentation purposes, it is desirable to have a limited number of categories, and impose this limit uniformly across many different data items in the database. Further, in cases where a few categories suffice, it is not desirable to introduce spurious categories where they provide no further information. Thus, we could choose:

$$\text{Count term} = 1 - (n/n\text{limit})^w$$

where n=category count, nlimit=an upper bound for n, and w=a positive weight parameter (for example, 3). The score for categorizations with small category counts will be relatively unaffected by this factor, and as the category count approaches the limit, the score will rapidly be diminished towards 0. It should be noted, however, that the particular form of the count term presented above is merely exemplary, and others having similar characteristics could likewise be used without departing from the spirit and scope of the instant invention.

Lastly, the final (summation) factor biases our choice towards categorizations which quantifiably present more information about the data value, using the information entropy measure from information theory. This value effectively measures how many bits would be required in an optimal representation of the category value. For example, one may consider the problem of breaking a data value into 4 categories. If we chose value ranges which exactly divided the population into 4 equal groups (p=¼ in each case), then the entropy term is 2. This does not yield a surprising result: 4 values in 2 bits. But if we had another 4-way categorization where the probability of two categories was 0 and the other two was ½, the entropy term would yield 1 bit. Thus, although 4 categories are provided, only 1 bit of information is required to represent the information. Intuitively, this categorization provides less information about the underlying data value—in effect, such categorization discards two categories by choosing particular value ranges. Similarly, if a categorization is selected such that all values fall into one category, the entropy term is 0, thus providing no information whatsoever about the underlying data value. Thus, it can be seen that the entropy measure provides a mechanism for computing the information term regardless of the probability distribution, which is important since there exist other constraints which generally prevent the equal division of data populations.

Given this background, the data categorization method of the instant invention is implemented through the following steps. References to the steps shown in the flowchart of FIG. 2 are provided in parenthesis. Column 603 of table 600

1. Conduct initial reconnaissance with the column values (Step 701), such as: (i) count the number of distinct column values; (ii) count the rows in the table; (iii) determine how many times the column value is null; (iv) get the maximum and the minimum values; (v) for numeric data, count how many negative, positive, and 0 values exist; and (vi) for character strings, count the number of blank strings. These are all rapid in SQL, and other SQL queries may be used to determine additional column characteristic to in turn provide additional detail regarding data characteristics.

2. Dispense with the case where the number of distinct values is so small we can categorize trivially by assigning one category per value (Steps 703 and 705). This is the case if the number of distinct values is less than maxcats. We also introduce a "defensive other" category (discussed above) in case any other values appear in the database later.

3. If the category-per-value mechanism does not apply (i.e., if the number of distinct values is greater than maxcats), we consider a "common value" encoding (Step 707). This assigns a category to the most common value; another category to the second, and so on. We will need an "other" category which sweeps together the less common values, and this category must be small enough to satisfy the maxothratio constraint. If that works, the data categorization is complete.

4. If common value categorization does not work (i.e., if the maxothratio constraint of step 3 is exceeded), then value ranges must be used (Steps 709 and 713), and the categorization breaks out by data type.

5. For numeric data, we seek sets of ranges subject to the constraints already discussed (uniform bands, not spanning 0, boundaries which are round numbers, etc.). We may introduce open ranges at either end ("10 or more", "less than 0") subject to the maximum-score criterion. The number of candidates we have to check is relatively small, with the categorized ranges spanning some number of standard deviations of the bulk of the data. We use the term "bulk of the data" because, on occasion, data has a degenerate distribution with outliers that mess things up. Therefore, it's best to calculate the mean and standard deviation with all the data in the usual way (using SQL to do sum of squares and sums), then repeat the calculation with only those values within, for example, 3 standard deviations of the mean. Having taken this precaution, we can generally find good categorizations by considering a couple different round-number range widths in the vicinity of 3 standard deviations divided by prefcats.

6. For date data, it's harder because date manipulations aren't always exactly what you need . . . but there's a relatively small number of categorization widths which are sensible anyway. Use the CASE or DECODE constructs (above), which both work with date data.

7. For character strings, if you're not categorized already then it's likely you have text data for which ranges are not meaningful. Looking at leading substrings alleviates this problem. Start with one character, then lengthen until the number of distinct values gets beyond prefcats. If it's beyond maxcats, too, then clump together small adjacent subranges until you have prefcats categories.

2. Automatic Semantic Role Generation

The following describes a method for automatically detecting semantic roles of tables and columns in databases.

The input comprises metadata describing the following about a set of database tables: (i) for tables, name, row count, column metadata, and relationships with other tables; (ii) for columns, name, data type, and distinct values. The output in turn comprises an assignment of semantic roles to some number of the data objects.

The method of the instant invention employs a set of heuristic rules which are depicted in the source code listing attached as Appendix A and incorporated herein by reference. The nature of the rules are documented within the rules themselves.

Basically, the rules articulate various kinds of conditional probabilities. For example, if I know nothing about a table whatsoever, there's a 10% chance it's a customer table. If a table is a market basket, then there's a 60% chance that it has a many-to-1 relationship with a customer table. Likewise, if a table name contains "cust", there's a 60% chance it's a customer table. Further, a customer table has a 60% chance of having many columns (relative to other tables in the schema).

There are many "built-in" propositions about tables and columns that can be combined in conditional probability rules. The rules have quantified probabilities, rather than "magic" scores or weights, so that over time we might be able to actually measure some of these probabilities over a large set of actual database schemas.

To turn these rules into roles, we perform the following process:

1. Read in the rules.
2. We create a prior probability matrix which, for each table, presents a probability for each table property in the rule set.
3. We create a similar matrix for columns.
4. We create probability matrices for tables and columns, containing our best estimate for each probability, which we initialize to the priors.
5. We then apply Bayesian probability equations to the conditional probabilities, refining the probability estimates. Using the lexicon that p(x|y) means "the probability of x, under the circumstance that y is true," the Bayesian conditional probability equation of interest is:

$$p(j|k_0, k_1, \ldots, k_n) \propto p(j) \, p(k_0|j) \, p(k_1|j) \ldots p(k_n|j)$$

That is, the probability of an alternative j given a set of supporting evidence k is proportional to the prior probability of j (the probability of that outcome without knowing anything about k's) multiplied by the conditional probabilities for each k given the alternative j is true.

The above equation assumes that the k's represent statistically independent events, although rarely are they actually independent in practice. However, despite the fact that practice may vary, the above equation is entirely suitable as a guide.

If a set of complete, mutually exclusive j's is available (that is, one and only one of them applies), then the probabilities for each of them is computed using the above Bayesian conditional probability equation. The result is then divided by the sum of the estimates for all possible outcomes, so that a set of probabilities summing to 1 is established.

6. The "most certain" (nearly 0, nearly 1) probability is then picked, and set with certainty.

7. Step 5 above is then repeated and the method continued until the highest probability is less than a threshold (e.g., 50%). If there are none, then the method stops.

This mechanism, with these rules, works well against a wide range of test schemas involving dozens of tables and hundreds of columns.

3. Data Table Link Identification

The following describes a method for identifying links between multiple tables, which links may optionally also specify a join path and/or an association. The inputs for the instant method comprise metadata for a set of tables (specifically, names for tables and columns, row counts for tables, distinct value counts for columns, min/max for columns, and data types for columns). Optionally, if SQL access is available to the tables, the method can take advantage of this to improve the quality of the join paths. The outputs comprise a set of SQL join paths (equijoin columns with multiplicities on each end) linking these tables.

With typical database schemas including dozens of tables or more and hundreds of columns or more, join paths (which combine columns, presenting possibilities which grow quadratically with column count) represents a large search space. It also means that any heuristic which is overly optimistic could easily generate countless incorrect join paths. However, most join paths are 1 to many. Further, most join paths are single columns. The method of the instant invention takes advantage of these observations to simplify the identification of join paths.

First, we seek columns which might be primary keys (the "1" in the 1 to many) by determining the presence of distinct value counts which are nearly equal to the row count of the table (e.g., the number of distinct values is greater than 99% of the number of rows in the table). We exclude very small tables (e.g., 30 or fewer rows), because for these every column will look like a key. We exclude from consideration data types unlikely to be key values, such as floating point data, images, and long character strings. (In the latter case, things like name or address fields may be nearly unique but they aren't keys.)

Next, the method of the instant invention looks around for the "many" end of a 1 to many association. For a given (suspected) primary key, we restrict our attention to matching fields of the same data type. We also only look in tables with row counts that are larger than the table currently being examined (i.e., if looking for a one-to-many relationship, the "many" table should have more rows than the "1" table). We look for columns whose number of distinct values is no more than the number of distinct values for the (suspected) primary key. The min/max range of the primary key should contain the min/max range of the (suspected) foreign key. The column names on each end of the suspected join path should be similar, although not necessarily identical, but some long common substring. For example, common substrings might not be considered unless the names are both at least 4 characters long. If that prerequisite is met, then the names are considered "similar" if the longest common substring is over half the size of the shortest string. Therefore, if a name is 4 characters, 3 must match; likewise, if a name is 6 characters long, 4 must match, etc. There should be an indication that the values in the foreign key column exist in the primary key column. This can be determine by, for example, doing some test queries to check both the minimum and the maximum foreign key value to confirm that they are both found in the primary key end of the relationship. Alternately, such indication may be determined by evaluating the min and max values for each column already being analyzed.

The above constraints are generally more restrictive than they strictly need to be and, as discussed earlier, they must be, because otherwise we'd have many problems from being "overly optimistic." But we find these constraints work well in practice.

The constraints of matching column names and matching data values can present particular challenges, because the conditions placed on these criteria and not as strictly defined as the other criteria. In a preferred embodiment of the instant invention, the matches for both name and value are rated as "strong," "good," or "poor," and the match is considered acceptable if at least one of these two is strong, or both are at least good. A "strong" name match is where the names match exactly. A "good" name match is where the names are "similar" if the longest common substring is over half the size of the shortest substring. A "strong" value match is where the minimum and maximum foreign key values are found in the primary table, and the data types (which must match) provide a strong hint (e.g., "integer" is not specific enough to provide a strong hint, but "char(18)" is). A "good" match is where either keys match or the data type is specific.

Note that this value match test cannot depend on both data sources being available. It is possible that a query may be looking for join paths between two disparate, disconnected data sources. Thus, it is necessary to discern as much information as possible from metadata gathered prior to seeking the join. For example, it might be revealed that the min and max of the foreign key happen to be the min and max of the primary key, which would not be all that unusual.

There is also a particular challenge with integer keys. Because integers are commonly used for counts, codes, and keys, you will generally find many integer values which "look like" foreign keys for any legitimate integer key you might have. For these, we require a partial name match where, once again, the longest common substring is over half the size of the shortest string.

The following listing schematically shows an exemplary method for implementing the above-described data table link identification method.

```
Create an empty "candidate key" (possible primary
    Keys) list.
For each table
    Determine the table's candidate keys as follows:
        If primary key found in DBMS' pk/fk metadata
            Use that primary key
        Else
            Consider each column as follows
                Start out assuming a column is a good. PK
                If number of distinct<30, not cool
                If distinct<99% of rowcount, not cool
                If data type unlikely (e.g. float, or
                    Decimal with fraction digits) not cool
                If cool, add to candidate keys list.
Look for foreign keys, and match them up with.
    Candidate keys, as follows.
    For each table
        For each column
            Start out assuming column is a good FK.
            If number of distinct<30, not cool
            If still cool
                For each candidate key in CK list
                    Start out assuming the CK-FK match is cool
                    If underlying tables are the same, not cool
                    If FK table smaller than CK table; not cool
                    If FK distinct>CK table rows, not cool
                    If data types not identical, not cool
                    How strong is column name match?
                        Strong:    identical
                        Good:      similar
```

-continued

```
How strong is data match?
Strong:  very specific data type match
         AND key value match
Good:    data type OR key value
If one is strong or both are good, cool.
If cool, add this CK/FK combo as 1 to
many join.
```

4. Metadata Description Generation

The following describes a method for producing an HTML document mapping the metadata such that it may be easily digested and utilized by a wide variety of end users, including database professionals, data analysts, and business end users, through a standard web browser. The HTML document attempts to articulate everything present in the XML metadata, thereby making direct reference to the XML unnecessary. End-user terminology and description are the principal focus, with database names and terminology being included as subheadings. Thus, the document is principally focused at the business user rather than the conventional focus of the database analyst: the database part is largely automated, it's the business use of information that is in most need of review and reference.

The HTML document first presents the user-provided title and description for a given data collection. Information is presented on the databases involved as a sub-heading.

Next, the HTML document presents the entity relationship ("ER") diagram for the collection of tables. This ER diagram is automatically laid out, as is set forth in greater detail below. The individual tables in the diagram are hot-linked, providing something of a visual "table of contents" for the document where each table description is a click away. Also, a short description is displayed when the mouse is pointed at a table in the ER diagram.

The HTML document next presents the list of tables in the data collection. This list contains both database (SQL) names and end-user names, if present. It also includes record counts and role information. Hot links let a user jump to an individual table's description.

The HTML document also displays all the table-to-table associations (joins) in tabular form.

After this, each table is presented. For each table, the HTML document begins with the user-provided title and description. If none is provided, the database (SQL) name is used as the title, and if the semantic role of the table has been determined, the document presents a paragraph describing that role along with the neighboring tables and their roles.

The HTML document then presents each table association in English, with statistical information on the relationship, for example, "Every customer is associated with an average of 4.08 sales." The other table in the relationship is hyperlinked, so the user can quickly go to that table's description.

Finally, there is a table presenting each column in the table (with its end-user name and SQL name, as well as useful information like data type, number of distinct values, max and min, etc.). The columns are hyperlinked to permit rapid navigation to their corresponding description.

Following that information, each column in the table is described. For each column, the HTML document first provides the user-provided title and description of a particular column value. If none is provided, the document presents the database (SQL) name as the title, and if the semantic role of the column has successfully been determined, the document presents a paragraph describing that role.

The document then provides a number of simple statistics that typically are helpful in understanding the data in the column. For example, the document indicates how many times the column is null, how many times it's zero, negative, or positive. If it's character data, the HTML document mentions how often it's blank. This helps a user rapidly spot certain kinds of data quality problems, including negative age, zero price, blank name.

Finally, the HTML document presents a value count distribution broken down by that column's categorization (a categorization we initially generated).

As mentioned above, the HTML document automatically generates and presents the hot-linked entity relationship ("ER") diagram for the collection of tables. In order to automatically generate such an ER diagram, the method of the instant invention receives as input a set of tables and the directed links between them, and generates as output an ER diagram suitable for human viewing (in which objects are not too close to each other, and links do not cross unless absolutely necessary). In order to carry out the automated generation and display of such an ER diagram, the method of the instant invention conducts the following steps:

(i) First, a small window or button is generated which displays a table label for each table. All of those windows or buttons are graphically arranged in a circle, ordered such that the total length of all the arcs between adjacent windows is minimized. This is done by doing a "sort" which swaps any two windows in the circle if that reduces the total arc length. To accomplish the sorting operation, assuming n points in a circle, we start by computing the coordinates of n equally spaced points, saving these point coordinates in an array. We arbitrarily assign these sequentially to each node to begin, and compute the total arc length in this configuration. That is, for each arc, we compute the length given the current placement, and add up the results. Then, for every node i, we consider swapping its position with every node j. We swap i with the j that results in the lowest total arc length (and do not swap at all if no swap reduces the arc length.)

(ii) Windows with more links are moved to the center of the chart.

(iii) Look for crossed arcs.

(iv) If none, iteratively expand the diagram in a way where everything repels but no new arc crossings are allowed (since the repulsion force is inverse-square, anything starting to cross is pushed away). Resize and reproportion to fit the available area, and return the resulting graph. To accomplish such resizing and reproportioning, we first note that we have a set of points with arbitrary coordinates, and a result rectangle of set size. To adjust the coordinates so they fit within the result rectangle, we pass over all the points, keeping min and max of the x coordinates. We determine a desired min and max x value based on rectangle size, adjusted to allow for presentation margins. We then apply a linear mapping to all the x values. Now the x values are in the desired range. The step is then repeated with the y values.

(v) If, however, crossings are found, seek simple knots and, if simple knots are found, fix them. For example, look for cliques that can be pulled across a crossed arc. More particularly, we seek to cure the situation where there are two crossing arcs, and on one end of one of those arcs are a set of interconnected points that have no connection to the "outside world" save that offending arc. In this case the clique can be moved across the other arc, removing the crossing and maintaining the graph integrity. Likewise, look for a loop which crosses an arc but which can go direct between two points.

(vi) If no such simple fixes exist, do a random move on the nodes and repulse all the nodes from each other.

(vii) Go back to step iv.

As explained above, by casting the metadata into HTML, the method of the instant invention makes it accessible to a wide audience, and eliminates the need for exotic tools (and exotic tool usage skills). Also, given that the metadata generated by the system and method of the instant invention goes beyond conventional database metadata (being more biased towards applications and end-users than towards databases), the document generated is, in fact, palatable to that broader audience.

The richness and interplay of the various types of metadata (going beyond tables and columns) allows the method of the instant invention to present information which is both useful for navigating the metadata and useful in understanding the underlying business information.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

APENDIX A

```

#                    THE ROLE MODEL

#    This document defines named properties of columns and tables,
#    along with assumed probabilities. Using these, Fido guesses
#    the properties of tables and columns.

#    "Roles" are externally-visible properties, with names known to the
#    WhoWhatWeb, and with semantics that are used by apps. A typical
#    table role might be "customer" or "product". A typical
#    column role might be $ price", "cost", or "date.of.birth".

#    If changes are made here which changes the role repertoire, it
#    is important that corresponding changes be made to
#    -   abstract.xml, which documents all the roles
#    -   fido.java, which generates default descriptions based
#        on detected roles

#    Organization of this file:
#    -   Table roles are defined.
#    -   Column usage properties are defined, breaking out columns by
#        their apparent usage (money, address, etc.).
#    -   Those usage properties, and other characteristics, are used
#        to build up models for table roles.

#    Before looking at table roles, let's look at declaration syntax
#    and what it means. Consider the declaration

#        customer   table,role,unique,0.1

#        "customer" is the property name. It can contain blanks, :,
and
#        =, but if so these must be escaped by preceding them with
"\".
#        "table" is the type of property (table or column).
#        "role" means that this is an external property. Unless this
#        is specified, it is assumed that the property is
internal . . .
#        merely a devise to help determine external properties.
#        "unique" defines multiplicity. Either unique or multiple can
be
#        specified . . . this says that if some table on the desktop
#        already has the role customer, we should not assign
#        another.
#        "0.1" is the prior probability. If I choose a table at
random,
#        what is the chance that it's a customer?

#-----------------------------------------------------------------------
#                         TABLE ROLES
#             Links:- < means 1:m, > means m:1
#-----------------------------------------------------------------------
#   Customer:    A unit (typically a person) with whom you do
business.
#   Examples:    passenger, buyer, patient, guest, cardholder, web
visitor
#   Links:       <basket <contact <sale <billing >channel >map
>employee
#   Contents:    name, address, phone number
customer         table,role,unique,0.1
#   Sale:        Atomic sale transaction.
#   Examples:    CDR, item sale, flight leg, invoice line item
#   Links:       >product >channel >basket >customer >calendar
#   Contents:    sale date, price, quantity
sale             table,role,unique,0.1
#   Product:     A service or product that can be sold to a customer
#   Links:       <sale <prodmess <prodsupp <message <inventory
#                >supplier >employee
#   Contents:    description, price, cost, department
product          table,role,unique,0.1
#   Basket:      A collection related of sale's to one customer.
#   Examples:    Airline itinerary, market basket, itemized invoice
#   Links:       <sale >customer >channel >calendar >employee
#   Contents:    date sold, total price
basket           table,role,unique,0.1
#   Channel:     A business unit which carries out sales.
#   Examples:    store, agent, reseller, dealer, branch
#   Links:       <sale <basket <customer <employee <inventory >map
#   Contents:    contact name, address, size/type
channel          table,role,unique,0.1
#   Message:     A marketing message, or offer, promoting products.
#   Examples:    web page, direct mail piece, telemarketing script
#   Links:       <contact <prodmess >product
#   Contents:    description
message          table,role,unique,0.1
#   Contact:     Delivery of a message to a customer.
#   Examples:    web hit, mail sent, inbound call taken
#   Links:       >customer >message >calendar
#   Contents:    date, duration
contact          table,role,unique,0.1
#   Supplier:    A manufacturer or provider of products sold
customers.
#   Examples:    vendor, manufacturer, service contractor.
#   Links:       <prodsupp <product >employee
#   Contents:    company name, contact name, address, phone
supplier         table,role,unique,0.1
#   Employee:    You know. An employee.
#   Links:       <product >channel <basket <customer <supplier
#   Contents:    name, address, job description, manager
employee         table,role,unique,0.1
#   Map:         Geographical or organizational heirarchy.
#   Links:       <channel <customer
#   Contents:    Region, division, district, department, area, city,
state
map              table,role,multiple,0.1
#   Calendar:    A time heirarchy.
#   Links:       <sale <basket <contact <billing <inventory
#   Contents:    date, week, month, quarter, season, year
calendar         table, role,multiple,0.1
#   Billing:     Periodic bills
#   Links:       >customer >calendar
#   Contents:    billing date, amount
billing          table,role,unique,0.1
#   Inventory:   Products on hand
#   Links:       >channel >product >calendar
#   Contents:    date, quantity on hand, location
inventory        table,role,unique,0.1
#   prodsupp:    Association between products and their suppliers
#   Links:       >product >supplier
#   Contents:    effectivity dates? I dunno
prodsupp         table,role,unique,0.05
```

APPENDIX A-continued

```
#   prodmess:   Association between product's and promotional
message's
#   Links:      >product >message
#   Contents:
prodmess        table,role,unique,0.05
#   Need to consider: recognizing "other" tables that can be
#   more easily identified from database terms than from business
#   usage . . . temp tables, summary tables, code lookup tables
#   There is one "best" role for each table.
#   It may not be in our list, in which case we call it
"other.table"
other.table     table,multiple,0.05
customer|product|sale|basket|contact|message|channel|employee|sup
plier|map|calendar|billing|inventory|other.table excl
#-----------------------------------------------------------------
#       MORE ON PROPERTIES: BUILT-INS, CONDITIONALS, ETC.
#-----------------------------------------------------------------

#   Properties which are not roles are defined as a mechanism for
#   finding roles. Their names or meanings are not visible outside
#   Fido. Some of these properties are built in (defined below).
#   Others are abstract properties like "money" or "address" which
#   are useful in building up definitions of roles.

#   Properties are related through conditional probabilities.
These
#   appear like this:

#       tn.contains.cust|customer   0.6

#   This says that, if a table has the property "customer", there
is
#   a 60% chance that tn.contains.cust is true (table name contains
#   "cust"). tn.contains.cust is a built-in property supplied by
Fido.

#       money|dec.x.2   0.7

#   This says that if a column is DECIMAL with two fraction digits,
#   there's a 70% chance that it's representing a money value.

#       char|in.customer   0.4

#   This says that 40% of the columns in customer tables are
#   character data types of one kind or another.

#   There are a number of built-in properties which are useful in
#   building up higher-level properties from low-level database
#   characteristics.

#   BUILT-IN COLUMN PROPERTIES
#       "date" is true for DATE columns.
#       "int" is true for integer columns.
#       "dec" is true for decimal columns.
#       "cn.contains.<str>" is true if the col name (the user-
#           visible label) contains <str> (case ignored).
#       "cn.is.<str>" is true if the column name matches <str>.
#       "char" is true for varchar or char columns.
#       "char>n" is true for character cols with a length attribute>n
#       "char<n" the same but the opposite.
#       "dec.x.2" is true for DECIMAL ? .2 columns
#       "in.<tprop>" is true for any column in a table that has the
#           table property <tprop>.
#       "many.distinct" is true for the top half of the columns in
#           terms of number of distinct values
#       "few.distinct" is a column property that's similar.
#       "distinct>x" is true for columns having more than x values.
#       "distinct<x" is true for columns having less than x values.

#   BUILT-IN TABLE PROPERTIES
#       "tn.contains.<str>", "tn.is.<str>" are true if a table name
#           contains a string or is equal to a string, respectively
#       "1.to.m.<tprop>" is a table property which is true if the
table
#           in question has a 1:m association with a table having the
#           <tprop> property. Example: a product table often has the
#           property "1.to.m.sale".
#       "m.to.1.<tprop>" is a table property. Guess what it means!
#       "has.<cprop>" is true if the table in question contains one
#           or more column having the <cprop> property.
#       "many.rows" is true if this table has more rows than most.
#       "few.rows" is true if this table has fewer rows than most.
#       "rows>n" is true if the table has more than n rows.
#       "rows<n" is similar, but the opposite.

#   Need to consider: many.cols, few.cols, cols>x, cols<x

#   Even built-in properties must be declared if used, e.g.

#       char column,multiple,0.3

#   This establishes the prior probability . . . and makes sure that
#   everything that's used as a property name is defined somewhere.

#   Some miscellaneous declarations that are used elsewhere

#   Distribution for Data Types in Tables
char                column,multiple,0.45
char>20             column,multiple,0.15
int                 column,multiple,0.25
dec                 column,multiple,0.17
date                column,multiple,0.10
many.rows table,multiple,0.5
few.rows table,multiple,0.5
has.money           table,multiple,0.5
has.name            table,multiple,0.2
has.address         table,multiple,0.2
has.phone           table,multiple,0.2
#-----------------------------------------------------------------
#           "APPARENT USAGE" COLUMN PROPERTIES
#-----------------------------------------------------------------
#   A money value
money               column,multiple,0.15
dec.x.2             column,multiple,0.15
dec.x.2|money       0.80
many.distinct|money 0.80
#   Money Taxonomy
saleprice           column,role,unique,0.03
salecost            column,role,unique,0.03
promcost            column,multiple,0.03
opcost              column,multiple,0.03
cashavail           column,multiple,0.03
revsummary          column,multiple,0.031
money|saleprice     0.99
money|salecost      0.99
money|promcost      0.99
money|opcost        0.99
money|cashavail     0.99
money|revsummary    0.99
saleprice|salecost|promcost|opcost|cashavail|revsummary
excl,money
cn.contains.price|saleprice         0.4
cn.contains.cost            column,multiple,0.02
cn.contains.cost|salecost           0.4
in.customer|saleprice               0.01
in.sale|saleprice                   0.6
in.basket|saleprice                 0.3
in.product|saleprice                0.1
in.customer|salecost                0.01
in.sale|salecost                    0.6
in.basket|salecost                  0.3
in.product|salecost                 0.1
#   Name of an individual or product or company
name                column,multiple,0.1
many.distinct       column,multiple,0.5
many.distinct|name  0.7
char>10             column,multiple,0.15
char>10|name        0.9
cn.contains.name    column,multiple,0.1
cn.contains.name|name   0.7
#   Name Taxonomy
customername        column,role,unique,0.02
productname         column,role,unique,0.02
suppliername        column,role,unique,0.02
channelname         column,role,unique,0.02
othername           column,multiple,0.03
customername|productname|suppliername|channelname|othername
```

APPENDIX A-continued

```
excl,name
in.customer|customername             0.7
in.product|productname               0.7
in.supplier|suppliername             0.7
in.channel|channelname               0.7
#    Street address
address                              column,multiple,0.1
many.distinct|address                0.7
#    defined elsewhere:  char>20     column,multiple,0.15
char>20|address                      0.9
cn.contains.addr                     column,multiple,0.1
cn.contains.addr|address             0.7
#    Telephone number
phone                                column,multiple,0.05
many.distinct|phone                  0.7
char>6                               column,multiple,0.2
char>6|phone                         0.7
cn.contains.phone                    column,multiple,0.03
phone|cn.contains.phone              0.7
#    A coded value. Small number of values, short field.
code                                 column,multiple,0.15
few.distinct                         column,multiple,0.5
few.distinct|code                    0.7
distinct<100                         column,multiple,0.3
distinct<100|code                    0.7
char<9                               column,multiple,0.1
char<9|code                          0.5
int|code                             0.5
#    A key value. Lots of values, short field.
key                                  column,multiple,0.15
many.distinct|key                    0.7
distinct>100                         column,multiple,0.7
distinct>100|key                     0.9
char<20                              column,multiple,0.15
char<20|key                          0.6
int|key                              0.4
cn.contains.key                      column,multiple,0.15
cn.contains.key|key                  0.3
cn.contains.id                       column,multiple,0.15
cn.contains.id|key                   0.3
cn.contains.no                       column,multiple,0.15
cn.contains.no|key                   0.3
#    Text ... description, comment, note
text                                 column,multiple,0.05
many.distinct|text                   0.7
char>30                              column,multiple,0.05
char>30|text                         0.8
cn.contains.descr                    column,multiple,0.02
cn.contains.descr|text               0.3
cn.contains.note                     column,multiple,0.04
cn.contains.note|text                0.3
#    Need to consider:  fleshing this out.  In particular
#    - Event dates
#    - Measures
other.col                            column,multiple,0.2
phone|name|address|key|code|money|text|other.col excl
#--------------------------------------------------------------------------------
#                 HINTS FOR GUESSING TABLE ROLES
#--------------------------------------------------------------------------------

#    CUSTOMER

#    - - - Hints from the ER diagram
m.to.1.customer                      table,multiple,0.1
m.to.1.customer|basket               0.7
m.to.1.customer|sale                 0.3
m.to.1.customer|contact              0.7
m.to.1.customer|billing              0.7
1.to.m.customer                      table,multiple,0.1
1.to.m.customer|channel              0.2
1.to.m.customer|map                  0.2
1.to.m.customer|employee             0.2
#    - - - Hints from the table name
tn.contains.cust                     table,multiple,0.05
customer|tn.contains.cust            0.6
tn.is.customer                       table,multiple,0.01
customer|tn.is.customer              0.9
tn.is.customers                      table,multiple,0.01
customer|tn.is.customers             0.9
#    - - - Hints from column names
cn.contains.cust                     column,multiple,0.02
has.cn.contains.cust                 table,multiple,0.10
customer|has.cn.contains.cust        0.50
#    - - - Hints from row count
many.rows|customer                   0.6
#    - - - Hints from data type distribution
in.customer                          column,multiple,0.1
char|in. customer                    0.6
char>20|in.customer                  0.4
date|in.customer                     0.05
int|in.customer                      0.2
dec|in.customer                      0.1
#    - - - Hints from column properties
has.name|customer                    0.8
has.address|customer                 0.7
has.phone|customer                   0.6

#    SALE

#    - - - Hints from the ER diagram
1.to.m.sale                          table,multiple,0.1
1.to.m.sale|product                  0.5
1.to.m.sale|basket                   0.7
1.to.m.sale|channel                  0.3
1.to.m.sale|customer                 0.3
1.to.m.sale|calendar                 0.5
#    - - - Hints from the table name
tn.contains.sale                     table,multiple,0.05
customer|tn.contains.sale            0.6
tn.is.sale                           table,multiple,0.01
customer|tn.is.sale                  0.9
tn.contains.cdr                      table,multiple,0.05
customer|tn.contains.cdr             0.6
tn.is.cdr                            table,multiple,0.01
customer|tn.is.cdr                   0.9
tn.is.sales                          table,multiple,0.01
customer|tn.is.sales                 0.9
#    - - - Hints from column names
cn.contains.sale                     column,multiple,0.02
has.cn.contains.sale                 table,multiple,0.10
sale|has.cn.contains.sale            0.50
cn.contains.price                    column,multiple,0.02
has.cn.contains.price                table,multiple,0.10
sale|has.cn.contains.price           0.30
cn.contains.quan                     column,multiple,0.02
has.cn.contains.quan                 table,multiple,0.10
sale|has.cn.contains.quan            0.30
#    - - - Hints from row count
many.rows|sale                       0.9
#    - - - Hints from data type distribution
in.sale                              column,multiple,0.1
char|in.sale                         0.3
char>20|in.sale                      0.05
date|in.sale                         0.2
int|in.sale                          0.3
dec|in.sale                          0.2
#    - - - Hints from column properties
has.money|sale                       0.9

#    BASKET

#    - - - Hints from the ER diagram
1.to.m.basket                        table,multiple,0.1
1.to.m.basket|customer               0.7
1.to.m.basket|channel                0.3
1.to.m.basket|employee               0.2
1.to.m.basket|calendar               0.2
m.to.1.basket                        table,multiple,0.1
m.to.1.basket|sale                   0.7
#    - - - Hints from the table name
tn.contains.bask                     table,multiple,0.1
basket|tn.contains.bask              0.6
#    - - - Hints from column names
cn.contains.bask                     column,multiple,0.02
has.cn.contains.bask                 table,multiple,0.03
basket|has.cn.contains.bask          0.50
#    - - - Hints from row count
many.rows|basket                     0.8
```

APPENDIX A-continued

```
#      - - - Hints from data type distribution
in.basket                           column,multiple,0.1
char|in.basket                      0.4
char>20|in.basket                   0.05
date|in.basket                      0.1
int|in.basket                       0.2
dec|in.basket                       0.2
#      - - - Hints from column properties

#      PRODUCT

#      - - - Hints from the ER diagram
m.to.1.product                      table,multiple,0.1
m.to.1.product|sale                 0.5
m.to.1.product|prodsupp             0.7
m.to.1.product|prodmess             0.7
m.to.1.product|inventory            0.7
m.to.1.product|message              0.3
1.to.m.product                      table,multiple,0.1
1.to.m.product|supplier             0.6
1.to.m.product|employee             0.2
#      - - - Hints from the table name
tn.contains.prod                    table,multiple,0.05
product|tn.contains.prod            0.6
tn.is.product                       table,multiple,0.01
product|tn.is.product               0.9
tn.is.products                      table,multiple,0.01
product|tn.is.products              0.9
#      - - - Hints from column names
cn.contains.prod                    column,multiple,0.02
has.cn.contains.prod                table,multiple,0.10
product|has.cn.contains.prod        0.50
cn.contains.model                   column,multiple,0.02
has.cn.contains.model               table,multiple,0.10
product|has.cn.contains.model       0.50
#      - - - Hints from row count
- - - Hints from data type distribution
in.product                          column,multiple,0.1
char|in.product                     0.6
char>20|in.product                  0.1
date|in.product                     0.05
int|in.product                      0.2
dec|in.product                      0.1
#      - - - Hints from column properties
has.money|product                   0.7

#      EMPLOYEE

#      - - - Hints from the ER diagram
1.to.m.employee                     table,multiple,0.1
1.to.m.employee|channel             0.3
m.to.1.employee                     table,multiple,0.1
m.to.1.employee|product             0.2
m.to.1.employee|basket              0.2
m.to.1.employee|customer            0.2
m.to.1.employee|supplier            0.2
#      - - - Hints from the table name
tn.contains.emp                     table,multiple,0.05
employee|tn.contains.emp            0.6
tn.is.employee                      table,multiple,0.03
employee|tn.is.employee             0.9
#      - - - Hints from column names
cn.contains.emp                     column,multiple,0.05
has.cn.contains.emp                 table,multiple,0.08
employee|has.cn.contains.emp        0.40
#      - - - Hints from row count
- - - Hints from data type distribution
in.employee                         column,multiple,0.1
char|in.employee                    0.45
char>20|in.employee                 0.15
int|in.employee                     0.25
dec|in.employee                     0.17
date|in.employee                    0.10
#      - - - Hints from column properties
has.name|employee                   0.7
has.address|employee                0.7

#      SUPPLIER

#      - - - Hints from the ER diagram
1.to.m.supplier                     table,multiple,0.1
1.to.m.supplier|prodsupp            0.7
1.to.m.supplier|product             0.2
m.to.1.supplier                     table,multiple,0.1
m.to.1.supplier|employee            0.2
#      - - - Hints from the table name
tn.contains.vend                    table,multiple,0.03
supplier|tn.contains.vend           0.5
tn.contains.supp                    table,multiple,0.05
supplier|tn.contains.supp           0.1
tn.contains.manu                    table,multiple,0.03
supplier|tn.contains.manu           0.3
#      - - - Hints from column names
cn.contains.supp                    column,multiple,0.05
has.cn.contains.supp                table,multiple,0.10
has.cn.contains.supp|supplier       0.15
cn.contains.vend                    column,multiple,0.05
has.cn.contains.vend                table,multiple,0.10
has.cn.contains.vend|supplier       0.30
cn.contains.manu                    column,multiple,0.05
has.cn.contains.manu                table,multiple,0.10
has.cn.contains.manu|supplier       0.30
#      - - - Hints from row count
- - - Hints from data type distribution
in.supplier                         column,multiple,0.1
#      - - - Hints from column properties
has.name|supplier                   0.7
has.address|supplier                0.7

#      INVENTORY

#      - - - Hints from the ER diagram
1.to.m.inventory                    table,multiple,0.1
1.to.m.inventory|channel            0.2
1.to.m.inventory|product            0.2
1.to.m.inventory|calendar           0.2
#      - - - Hints from the table name
tn.contains.inv                     table,multiple,0.1
inventory|tn.contains.inv           0.3
#      - - - Hints from column names
cn.contains.inv                     column,multiple,0.05
has.cn.contains.inv                 table,multiple,0.10
has.cn.contains.inv|inventory       0.15
#      - - - Hints from row count
- - - Hints from data type distribution
in.inventory                        column,multiple,0.1
#      - - - Hints from column properties

#      PRODSUPP

#      - - - Hints from the ER diagram
1.to.m.prodsupp                     table,multiple,0.1
1.to.m.prodsupp|product             0.2
1.to.m.prodsupp|supplier            0.2
m.to.1.product|prodsupp             0.7
m.to.1.supplier|prodsupp            0.7
#      - - - Hints from the table name
- - - Hints from column names
#      - - - Hints from row count
- - - Hints from data type distribution
- - - Hints from column properties

#      PRODMESS

#      - - - Hints from the ER diagram
1.to.m.prodmess                     table,multiple,0.1
1.to.m.prodmess|product             0.2
1.to.m.prodmess|message             0.2
m.to.1.product|prodmess             0.7
m.to.1.message|prodmess             0.7
#      - - - Hints from the table name
- - - Hints from column names
#      - - - Hints from row count
- - - Hints from data type distribution
- - - Hints from column properties

#      CONTACT

```

APPENDIX A-continued

```
#    - - - Hints from the ER diagram
1.to.m.contact                   table,multiple,0.1
1.to.m.contact|message           0.7
1.to.m.contact|customer          0.3
1.to.m.contact|calendar          0.2
#    - - - Hints from the table name
- - - Hints from column names
cn.contains.call                 column,multiple,0.05
has.cn.contains.call             table,multiple,0.10
has.cn.contains.call|contact     0.15
cn.contains.mail                 column,multiple,0.05
has.cn.contains.mail             table,multiple,0.10
has.cn.contains.mail|contact     0.15
cn.contains.hit                  column,multiple,0.05
has.cn.contains.hit              table,multiple,0.10
has.cn.contains.hit|contact      0.15
#    - - - Hints from row count
- - - Hints from data type distribution
in.contact                       column,multiple,0.1
#    - - - Hints from column properties

#    MESSAGE

#    - - - Hints from the ER diagram
1.to.m.message                   table,multiple,0.1
1.to.m.message|product           0.2
m.to.1.message                   table,multiple,0.1
m.to.1.message|contact           0.5
m.to.1.message|prodmess          0.7
#    - - - Hints from the table name
- - - Hints from column names
cn.contains.url                  column,multiple,0.05
has.cn.contains.url              table,multiple,0.10
has.cn.contains.url|message      0.15
#    - - - Hints from row count
- - - Hints from data type distribution
in.message                       column,multiple,0.1
#    - - - Hints from column properties

#    CHANNEL

#    - - - Hints from the ER diagram
m.to.1.channel                   table,multiple,0.1
m.to.1.channel|sale              0.5
m.to.1.channel|employee          0.2
m.to.1.channel|basket            0.5
m.to.1.channel|inventory         0.5
m.to.1.channel|customer          0.2
1.to.m.channel                   table,multiple,0.1
1.to.m.channel|map               0.2
#    - - - Hints from the table name
- - - Hints from column names
cn.contains.store                column,multiple,0.05
has.cn.contains.store            table,multiple,0.10
has.cn.contains.store|channel    0.30
cn.contains.agent                column,multiple,0.05
has.cn.contains.agent            table,multiple,0.10
has.cn.contains.agent|channel    0.30
cn.contains.branch               column,multiple,0.05
has.cn.contains.branch           table,multiple,0.10
has.cn.contains.branch|channel   0.30
cn.contains.dealer               column,multiple,0.05
has.cn.contains.dealer           table,multiple,0.10
has.cn.contains.dealer|channel   0.30
#    - - - Hints from row count
- - - Hints from data type distribution
in.channel                       column,multiple,0.1
#    - - - Hints from column properties

#    BILLING

#    - - - Hints from the ER diagram
1.to.m.billing                   table,multiple,0.1
1.to.m.billing|customer          0.2
1.to.m.billing|calendar          0.2
#    - - - Hints from the table name
- - - Hints from column names
cn.contains.bill                 column,multiple,0.05
has.cn.contains.bill             table,multiple,0.10
has.cn.contains.bill|billing     0.30
cn.contains.statement            column,multiple,0.05
has.cn.contains.statement        table,multiple,0.10
has.cn.contains.statement|billing 0.30
#    - - - Hints from row count
- - - Hints from data type distribution
in.billing                       column,multiple,0.1
#    - - - Hints from column properties

#    CALENDAR

#    - - - Hints from the ER diagram
m.to.1.calendar                  table,multiple,0.1
m.to.1.calendar|sale             0.3
m.to.1.calendar|basket           0.2
m.to.1.calendar|contact          0.2
m.to.1.calendar|billing          0.2
m.to.1.calendar|inventory        0.2
#    - - - Hints from the table name
- - - Hints from column names
cn.contains.month                column,multiple,0.02
has.cn.contains.month            table,multiple,0.03
has.cn.contains.month|calendar   0.30
cn.contains.week                 column,multiple,0.02
has.cn.contains.week             table,multiple,0.03
has.cn.contains.week|calendar    0.30
cn.contains.quarter              column,multiple,0.02
has.cn.contains.quarter          table,multiple,0.03
has.cn.contains.quarter|calendar 0.30
cn.contains.season               column,multiple,0.02
has.cn.contains.season           table,multiple,0.03
has.cn.contains.season|calendar  0.30
#    - - - Hints from row count
few.rows|calendar                0.8
#    - - - Hints from data type distribution
- - - Hints from column properties

#    MAP

#    - - - Hints from the ER diagram
m.to.1.map                       table,multiple,0.1
m.to.1.map|channel               0.3
m.to.1.map|customer              0.3
m.to.1.map|employee              0.3
m.to.1.map|map                   0.3
1.to.m.map                       table,multiple,0.1
1.to.m.map|map                   0.3
#    - - - Hints from the table name
tn.contains.dep                  table,multiple,0.1
map|tn.contains.dep              0.3
tn.contains.loc                  table,multiple,0.1
map|tn.contains.loc              0.3
#    - - - Hints from column names
cn.contains.region               column,multiple,0.02
has.cn.contains.region           table,multiple,0.03
has.cn.contains.region|map       0.30
cn.contains.dept                 column,multiple,0.02
has.cn.contains.dept             table,multiple,0.10
has.cn.contains.dept|map         0.30
cn.contains.department           column,multiple,0.01
has.cn.contains.department       table,multiple,0.03
has.cn.contains.department|map   0.30
cn.contains.div                  column,multiple,0.05
has.cn.contains.div              table,multiple,0.10
has.cn.contains.div|map          0.30
cn.contains.dist                 column,multiple,0.05
has.cn.contains.dist             table,multiple,0.10
has.cn.contains.dist|map         0.30
#    - - - Hints from row count
few.rows|map                     0.8
#    - - - Hints from data type distribution
- - - Hints from column properties

#    Some closing comments:

#    Although roles aren't mutually exclusive, Fido treats
#    them as if they are. Think of it as assigning each role to the
database
#    object which is the BEST fit to that role. This avoids woolly
```

APPENDIX A-continued

```
#   philosophical discussions like "Isn't an employee a customer"
and
#   "Isn't a customer a salesman".

#   The numbers here are not "magic weights": they are probability
#   values which can be measured from databases where the
#   classifications are correctly assigned. What you see here are
#   initial guesses at these probability values. As experience is
#   gathered, the model will be more and more accurate . . . and new
#   properties can be added, so long as there are reasonable
guesses
#   for relevant probabilities.

```

What is claimed is:

1. A method for categorizing data values contained within a column within a database table, said method comprising the steps of:

determining a number of distinct values contained within said database column;

creating a data category for each one of said distinct values when said number of distinct values is not greater than a predetermined maximum number of allowed value categories;

creating a data category for each one of a plurality of most common values and an additional category to include all values not included in any one of said plurality of most common values when said number of distinct values is greater than said predetermined maximum number of allowed value categories and the number of values not included in any one of said plurality of most common values is not greater than a predetermined number of allowed additional values; and creating a plurality of data categories, each one of said data categories including one of a plurality of value ranges when said number of distinct values is greater than said first predetermined maximum number of allowed value categories and the number of values not included in any one of said plurality of most common values is greater than a predetermined number of allowed additional values.

2. The method for categorizing data values contained within a column within a database table in accordance with claim 1, said step of determining a number of distinct values contained within said database column includes the step of:

counting the number of rows contained within said database table.

3. The method for categorizing data values contained within a column within a database table in accordance with claim 1, said step of determining a number of distinct values contained within said database column includes the step of:

counting the number of distinct column values contained within said database table.

4. The method for categorizing data values contained within a column within a database table in accordance with claim 1, wherein:

said data values comprise numeric data values; and said value ranges and corresponding data categories are determined through application of statistical functions to said the numeric data values contained within said column.

5. The method for categorizing data values contained within a column within a database table in accordance with claim 1, wherein:

said data values comprise character data values; and said value ranges and corresponding data categories are determined by examining leading substrings included within said character data values contained within said column.

\* \* \* \* \*